United States Patent
Chen et al.

(10) Patent No.: US 10,873,425 B2
(45) Date of Patent: Dec. 22, 2020

(54) ACKNOWLEDGEMENT / NEGATIVE ACKNOWLEDGEMENT FEEDBACK FOR TDD

(75) Inventors: Wanshi Chen, San Diego, CA (US); Juan Montojo, San Diego, CA (US); Xiliang Luo, Northridge, CA (US)

(73) Assignee: QUALCOMM Incorporated, San Diego, CA (US)

(*) Notice: Subject to any disclaimer, the term of this patent is extended or adjusted under 35 U.S.C. 154(b) by 422 days.

(21) Appl. No.: 13/293,086

(22) Filed: Nov. 9, 2011

(65) Prior Publication Data
US 2012/0287828 A1 Nov. 15, 2012

Related U.S. Application Data

(60) Provisional application No. 61/413,341, filed on Nov. 12, 2010.

(51) Int. Cl.
- H04L 1/18 (2006.01)
- H04L 5/00 (2006.01)
- H04L 1/16 (2006.01)

(52) U.S. Cl.
CPC .......... *H04L 1/1861* (2013.01); *H04L 1/1614* (2013.01); *H04L 1/1864* (2013.01); *H04L 5/0044* (2013.01)

(58) Field of Classification Search
None
See application file for complete search history.

(56) References Cited

U.S. PATENT DOCUMENTS

| | | | |
|---|---|---|---|
| 7,233,771 B2 | 6/2007 | Proctor, Jr. et al. | |
| 7,957,329 B2 | 6/2011 | Ahn et al. | |
| 8,675,573 B2 | 3/2014 | Montojo et al. | |
| 9,106,419 B2 * | 8/2015 | Chen ................... | H04W 52/325 |
| 9,112,692 B2 * | 8/2015 | Chen ................... | H04B 7/0417 |

(Continued)

FOREIGN PATENT DOCUMENTS

| | | |
|---|---|---|
| JP | 2011505773 A | 2/2011 |
| JP | 2011517168 A | 5/2011 |

(Continued)

OTHER PUBLICATIONS

Ericsson et al: "A/N transmission in the uplink for carrier aggregation", 3GPP Draft; R1-100044, 3rd Generation Partnership Project (3GPP), Mobile Competence Centre ; 650, Route Des Lucioles ; F-06921 Sophia-Anti Polis Cedex; France, vol. RAN WG1, no. Valencia, Spain; Jan. 18, 2010, Jan. 15, 2010 (Jan. 15, 2010), XP050418357, [retrieved on Jan. 15, 2010].

(Continued)

*Primary Examiner* — Christopher T Wyllie
(74) *Attorney, Agent, or Firm* — Seyfarth Shaw LLP

(57) ABSTRACT

Bits for acknowledgement (ACK) and/or negative acknowledgement (NAK) may be allocated based on whether a special subframe configuration in a TDD configuration permits downlink transmission. For carrier aggregation, ACK/NAK bits may be allocated only to special subframes in component carriers (CCs) which permit downlink transmission. Also, for example, ACK/NAK bits may be allocated to all CC special subframes if a single CC is configured to allow downlink transmission on one of its special subframes. ACK/NAK bits may also be allocated to all special subframes.

44 Claims, 14 Drawing Sheets

(56) References Cited

U.S. PATENT DOCUMENTS

| | | | |
|---|---|---|---|
| 9,591,662 B2* | 3/2017 | Chen | H04L 1/1861 |
| 2004/0073321 A1* | 4/2004 | Kondo | H04N 7/0125 |
| | | | 700/28 |
| 2009/0213769 A1* | 8/2009 | Shen | H04L 1/1838 |
| | | | 370/280 |
| 2009/0241004 A1 | 9/2009 | Ahn et al. | |
| 2009/0323617 A1* | 12/2009 | Che | H04L 1/1829 |
| | | | 370/329 |
| 2010/0111024 A1* | 5/2010 | Fan | H04L 5/0055 |
| | | | 370/329 |
| 2010/0195587 A1 | 8/2010 | Ratasuk et al. | |
| 2010/0271970 A1* | 10/2010 | Pan | H04L 1/0029 |
| | | | 370/252 |
| 2011/0002276 A1* | 1/2011 | Chen et al. | 370/329 |
| 2011/0023066 A1 | 1/2011 | Jang et al. | |
| 2011/0096693 A1* | 4/2011 | Astely | H04L 27/18 |
| | | | 370/252 |
| 2011/0110262 A1* | 5/2011 | Yu | H04L 1/1854 |
| | | | 370/252 |
| 2011/0201333 A1* | 8/2011 | Kwon et al. | 455/434 |
| 2011/0239076 A1* | 9/2011 | Liu et al. | 714/751 |
| 2011/0242997 A1* | 10/2011 | Yin | H04W 72/02 |
| | | | 370/252 |
| 2011/0243066 A1* | 10/2011 | Nayeb Nazar | H04L 1/007 |
| | | | 370/328 |
| 2011/0243107 A1* | 10/2011 | Koivisto | H04W 72/1215 |
| | | | 370/336 |
| 2011/0292846 A1* | 12/2011 | Hu | H04W 72/00 |
| | | | 370/280 |
| 2012/0008574 A1* | 1/2012 | Xiao | H04W 72/042 |
| | | | 370/329 |
| 2012/0039279 A1* | 2/2012 | Chen | H04W 72/1284 |
| | | | 370/329 |
| 2012/0039342 A1* | 2/2012 | Berggren et al. | 370/474 |
| 2012/0044871 A1* | 2/2012 | Li et al. | 370/328 |
| 2012/0082263 A1* | 4/2012 | Ebrahimi Tazeh Mahalleh et al. | 375/299 |
| 2012/0083280 A1* | 4/2012 | Liu | H04W 16/16 |
| | | | 455/446 |
| 2012/0087254 A1* | 4/2012 | Yin et al. | 370/252 |
| 2012/0106569 A1* | 5/2012 | Che et al. | 370/437 |
| 2012/0113831 A1* | 5/2012 | Pelletier et al. | 370/252 |
| 2012/0113907 A1* | 5/2012 | Baldemair | H04W 52/146 |
| | | | 370/329 |
| 2012/0155414 A1* | 6/2012 | Noh | H04L 5/0048 |
| | | | 370/329 |
| 2012/0163335 A1* | 6/2012 | Chung | H04L 5/0037 |
| | | | 370/330 |
| 2012/0327885 A1* | 12/2012 | Chung | H04L 1/1671 |
| | | | 370/329 |
| 2012/0329400 A1* | 12/2012 | Seo | H04L 5/00 |
| | | | 455/63.1 |
| 2013/0176920 A1* | 7/2013 | Seo et al. | 370/280 |
| 2013/0188510 A1 | 7/2013 | Siomina et al. | |

FOREIGN PATENT DOCUMENTS

| | | | |
|---|---|---|---|
| JP | 2012514910 A | | 6/2012 |
| KR | 20100074328 A | | 7/2010 |
| WO | 2005115022 A2 | | 12/2005 |
| WO | 2006130742 A1 | | 12/2006 |
| WO | 2009116754 A2 | | 9/2009 |
| WO | 2009137481 | | 11/2009 |
| WO | WO2009137646 | | 11/2009 |
| WO | WO 2010/009645 | * | 1/2010 |
| WO | 2010051695 A1 | | 5/2010 |
| WO | 2010091165 A2 | | 8/2010 |
| WO | WO2011047196 | | 4/2011 |
| WO | WO 2011/118993 | * | 9/2011 |
| WO | WO 2012/051756 | * | 4/2012 |

OTHER PUBLICATIONS

Huawei : "PUCCH design for carrier aggregation", 3GPP Draft; R1-093046, 3rd Generation Partnership Project (3GPP), Mobile Competence Centre ; 650, Route Des Lucioles ; F-06921 Sophia-Antipolis Cedex; France, no. Shenzhen, China; Aug. 18, 2009, Aug. 18, 2009 (Aug. 18, 2009) , XP050351438, [retrieved on Aug. 18, 2009].

International Search Report and Written Opinion—PCT/US2011/060143—ISA/EPO—dated Feb. 9, 2012.

CATT, "UL ACK/NAK transmission for TDD with CA," 3GPP TSG RAN WG1 Meeting #61bis R1-103469,Jun. 28, 2010.

"Consideration on UL ACK/NAK Feedback in LTE-A TDD," 3GPP TSG RAN WG1 Meeting #62b R1-105675,Oct. 11, 2010.

* cited by examiner

ACKNOWLEDGEMENT / NEGATIVE ACKNOWLEDGEMENT FEEDBACK FOR TDD

CROSS-REFERENCE TO RELATED APPLICATION

This application claims the benefit under 35 U.S.C. § 119(e) to U.S. Provisional Patent Application No. 61/413,341, entitled, IMPROVED ACKNOWLEDGEMENT/ NEGATIVE ACKNOWLEDGEMENT FEEDBACK FOR TDD, filed on Nov. 12, 2010, in the names of CHEN, et al., the disclosure of which is expressly incorporated by reference herein in its entirety.

BACKGROUND

1. Field

Aspects of the present disclosure relate generally to wireless communication systems, and more particularly to improved acknowledgement/negative acknowledgement feedback for time division duplexing (TDD) operation in LTE-A carrier aggregation.

2. Background

Wireless communication networks are widely deployed to provide various communication services such as voice, video, packet data, messaging, broadcast, etc. These wireless networks may be multiple-access networks capable of supporting multiple users by sharing the available network resources. A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

SUMMARY

A method of wireless communication is offered. The method includes receiving a configuration of an uplink control format supporting at least three acknowledgement/negative acknowledgement (ACK/NAK) bits in a time division duplex (TDD) system. The method also includes determining whether a special subframe configuration supports downlink data transmission. The method further includes allocating a number of ACK/NAK bits based at least in part on the determination. The method still further includes transmitting ACK/NAK information in an uplink subframe based at least in part on the allocation.

An apparatus for wireless communication is offered. The apparatus includes means for receiving a configuration of an uplink control format supporting at least three acknowledgement/negative acknowledgement (ACK/NAK) bits in a time division duplex (TDD) system. The apparatus also includes means for determining whether a special subframe configuration supports downlink data transmission. The apparatus further includes means for allocating a number of ACK/NAK bits based at least in part on the determination. The apparatus still further includes means for transmitting ACK/NAK information in an uplink subframe based at least in part on the allocation.

A computer program product for wireless communication in a wireless network is offered. The computer program product includes a non-transitory computer-readable medium having non-transitory program code recorded thereon. The non-transitory program code includes program code to receive a configuration of an uplink control format supporting at least three acknowledgement/negative acknowledgement (ACK/NAK) bits in a time division duplex (TDD) system. The non-transitory program code also includes program code to determine whether a special subframe configuration supports downlink data transmission. The non-transitory program code further includes program code to allocate a number of ACK/NAK bits based at least in part on the determination. The non-transitory program code still further includes program code to transmit ACK/NAK information in an uplink subframe based at least in part on the allocation.

An apparatus for wireless communication is offered. The apparatus includes a memory and a processor(s) coupled to the memory. The processor(s) is configured to receive a configuration of an uplink control format supporting at least three acknowledgement/negative acknowledgement (ACK/NAK) bits in a time division duplex (TDD) system. The processor(s) is also configured to determine whether a special subframe configuration supports downlink data transmission. The processor(s) is further configured to allocate a number of ACK/NAK bits based at least in part on the determination. The processor(s) is still further configured to transmit ACK/NAK information in an uplink subframe based at least in part on the allocation.

A method of wireless communication is offered. The method includes sending a configuration of an uplink control format supporting at least three acknowledgement/negative acknowledgement (ACK/NAK) bits in a time division duplex (TDD) system. The method also includes determining whether a special subframe configuration supports downlink data transmission. The method further includes allocating a number of ACK/NAK bits based at least in part on the determination. The method still further includes receiving ACK/NAK information in an uplink subframe based at least in part on the allocation.

An apparatus for wireless communication is offered. The apparatus includes means for sending a configuration of an uplink control format supporting at least three acknowledgement/negative acknowledgement (ACK/NAK) bits in a time division duplex (TDD) system. The apparatus also includes means for determining whether a special subframe configuration supports downlink data transmission. The apparatus further includes means for allocating a number of ACK/NAK bits based at least in part on the determination. The apparatus still further includes means for receiving ACK/NAK information in an uplink subframe based at least in part on the allocation.

A computer program product for wireless communication in a wireless network is offered. The computer program product includes a non-transitory computer-readable medium having non-transitory program code recorded thereon. The non-transitory program code includes program code to send a configuration of an uplink control format supporting at least three acknowledgement/negative acknowledgement (ACK/NAK) bits in a time division duplex (TDD) system. The non-transitory program code also includes program code to determine whether a special subframe configuration supports downlink data transmission. The non-transitory program code further includes program code to allocate a number of ACK/NAK bits based at least in part on the determination. The non-transitory program code still further includes program code to receive ACK/NAK information in an uplink subframe based at least in part on the allocation.

An apparatus for wireless communication is offered. The apparatus includes a memory and a processor(s) coupled to the memory. The processor(s) is configured to send a configuration of an uplink control format supporting at least three acknowledgement/negative acknowledgement (ACK/NAK) bits in a time division duplex (TDD) system. The processor(s) is also configured to determine whether a special subframe configuration supports downlink data transmission. The processor(s) is further configured to allocate a number of ACK/NAK bits based at least in part on the determination. The processor(s) is still further configured to receive ACK/NAK information in an uplink subframe based at least in part on the allocation.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA) and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
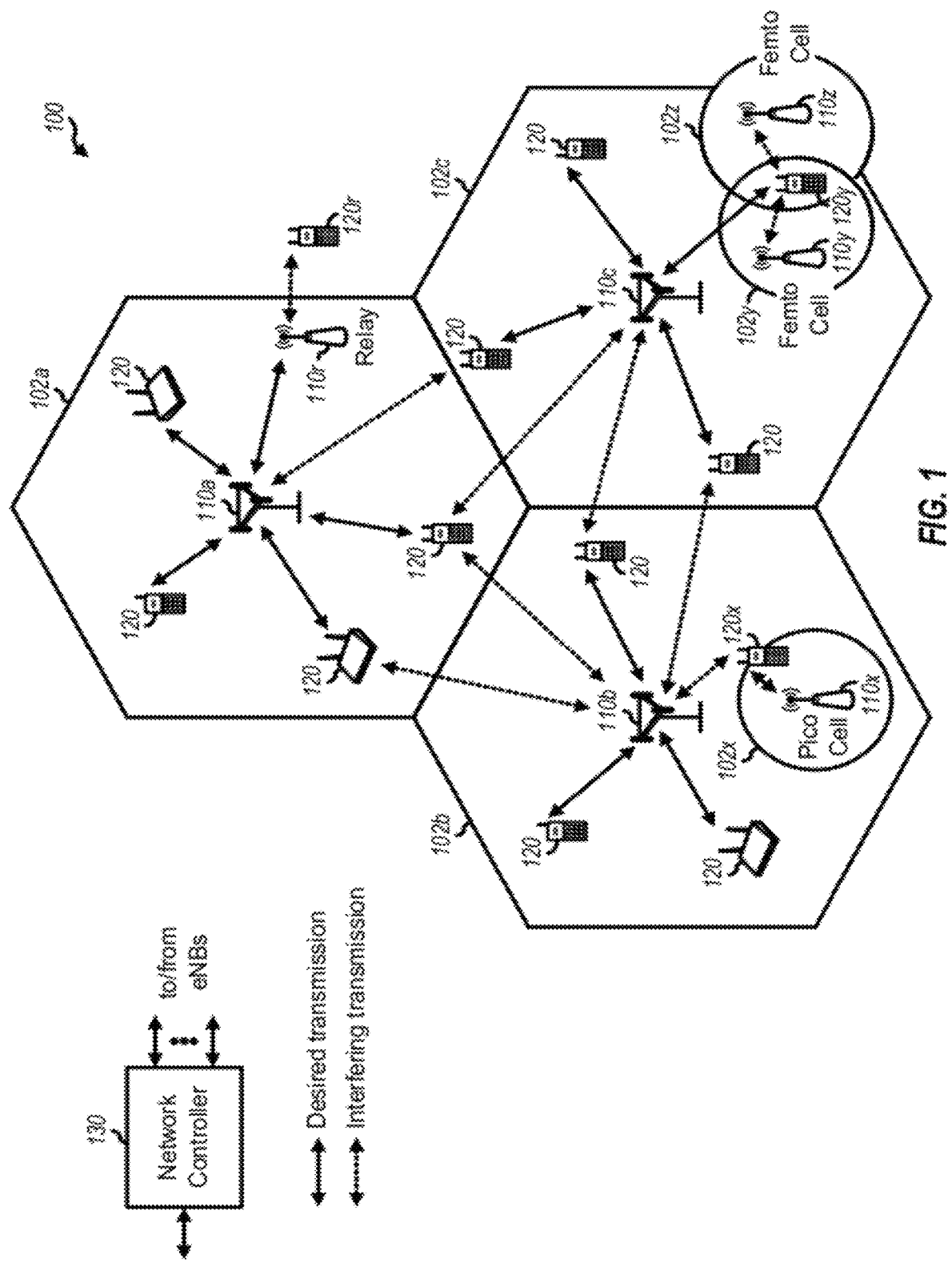
FIG. 1 is a block diagram conceptually illustrating an example of a telecommunications system.

FIG. 1 shows a wireless communication network 100, which may be an LTE-A network, using improved acknowledgement/negative acknowledgement feedback for TDD configurations. The wireless network 100 includes a number of evolved node Bs (eNodeBs) 110 and other network entities. An eNodeB may be a station that communicates with the UEs and may also be referred to as a base station, a node B, an access point, and the like. An eNodeB may comprise a relay station (e.g., 110r). Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect, the wireless network 100 may support Frequency Division Duplex (FDD) or Time Division Duplex (TDD) modes of operation. The techniques described herein may be used for TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 (e.g., UE 120x, UE 120y, etc.) are dispersed throughout the wireless network 100, and each UE may be stationary or mobile. A UE may also be referred to as a terminal, a user terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a netbook, a smart book, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10, 15 or 20 MHz, respectively.

Figure 2:
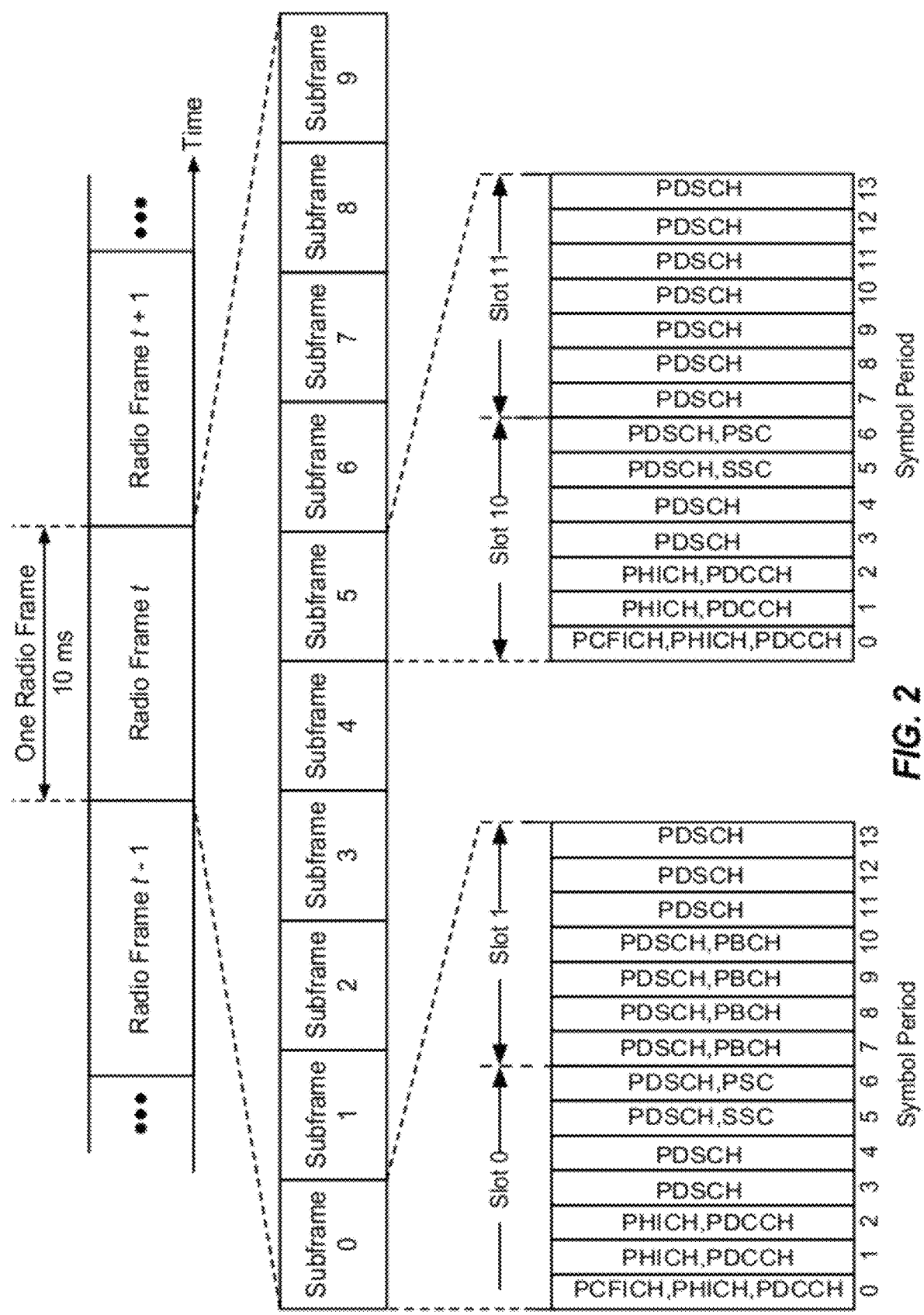
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
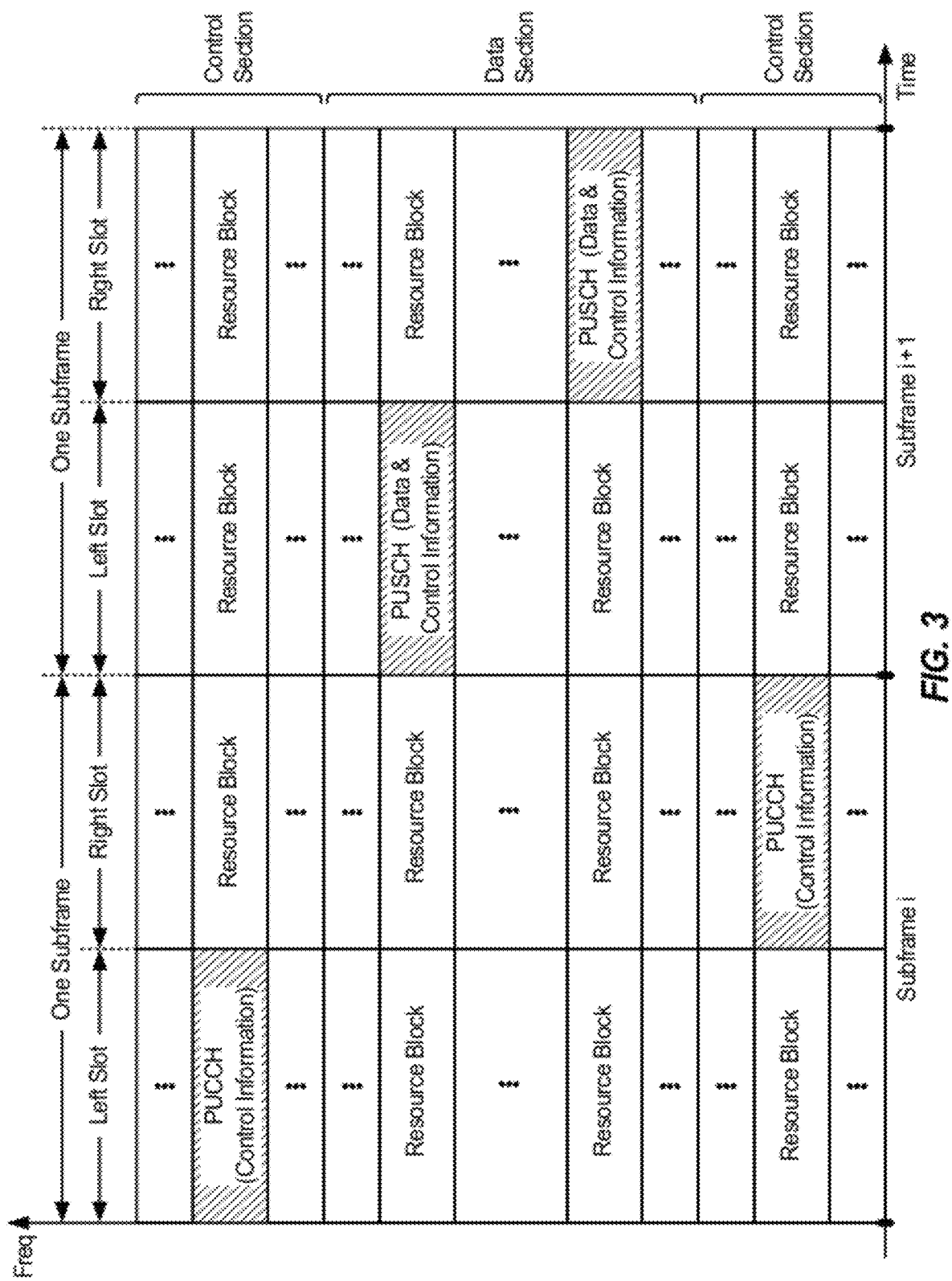
FIG. 3 is a block diagram conceptually illustrating an example frame structure in uplink communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

The PSC (primary synchronization carrier), SSC (secondary synchronization carrier), CRS (common reference signal), PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
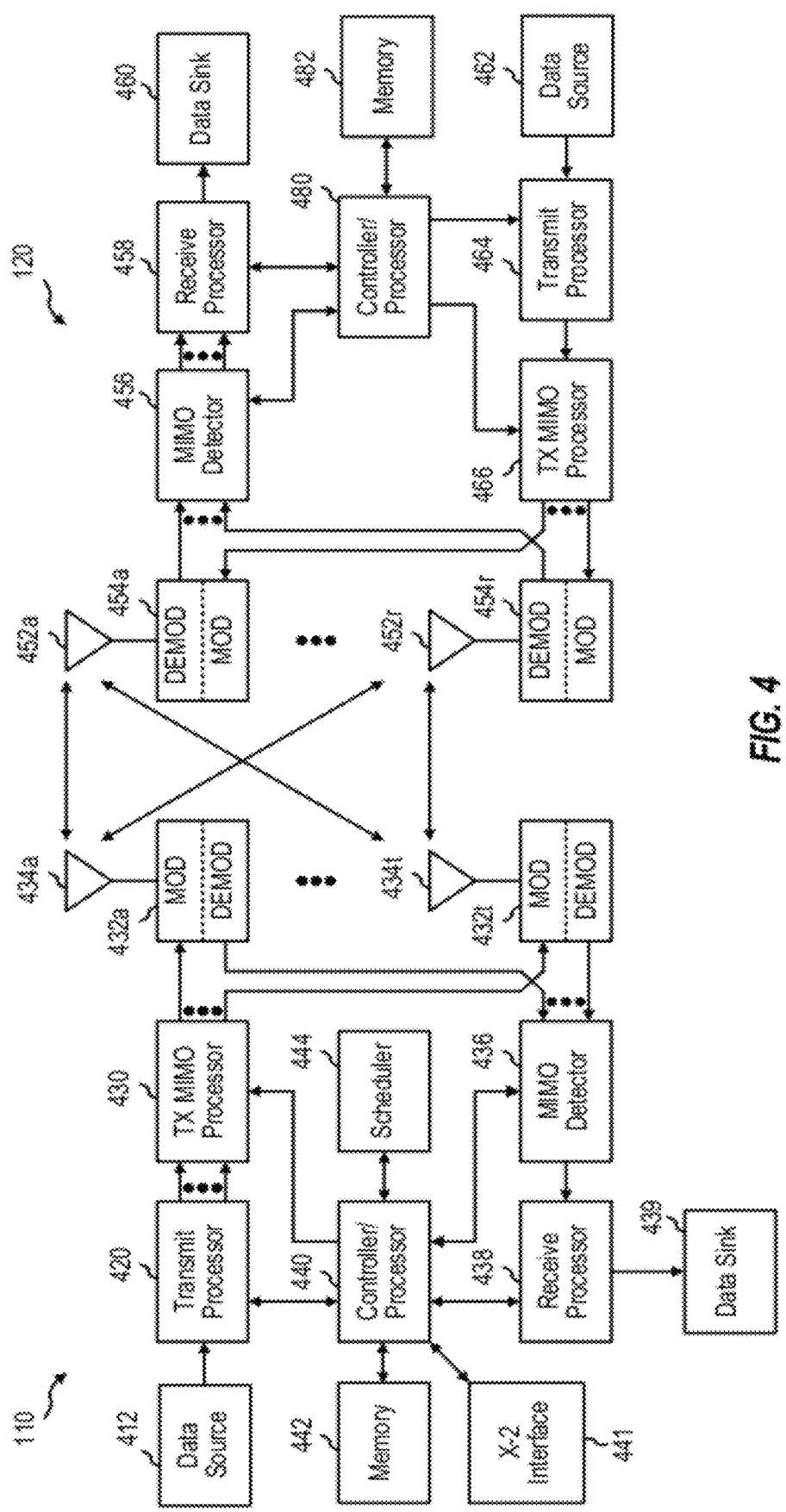
FIG. 4 is a block diagram conceptually illustrating a design of a base station/eNodeB and a UE configured according to an aspect of the present disclosure.

FIG. 4 shows a block diagram of a design of a base station/eNodeB 110 and a UE 120, which may be one of the base stations/eNodeBs and one of the UEs in FIG. 1. For example, the base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in use method flow chart FIG. 10, and/or other processes for the techniques described herein. The memories 442 and 482 may store data and program codes for the base station 110 and the UE 120, respectively. A scheduler 444 may schedule UEs for data transmission on the downlink and/or uplink.

Carrier Aggregation

LTE-Advanced UEs use spectrum in up to 20 MHz bandwidths allocated in a carrier aggregation of up to a total of 100 MHz (5 component carriers) used for transmission in each direction. Carrier aggregation may also be referred to as multi-carrier operation. A carrier may also be referred to as a component carrier (CC), a cell, etc. A carrier used for the downlink may be referred to as a downlink CC, and a carrier used for the uplink may be referred to as an uplink CC. An eNodeB may transmit data and control information on one or more downlink CCs to a UE. The UE may transmit data and control information on one or more uplink CCs to the eNodeB. Generally, less traffic is transmitted on the uplink than the downlink, so the uplink spectrum allocation may be smaller than the downlink allocation. For example, if 20 MHz is assigned to the uplink, the downlink may be assigned 100 Mhz. These asymmetric FDD assignments will conserve spectrum and are a good fit for the typically asymmetric bandwidth utilization by broadband subscribers.

Carrier Aggregation Types

Figure 5A:
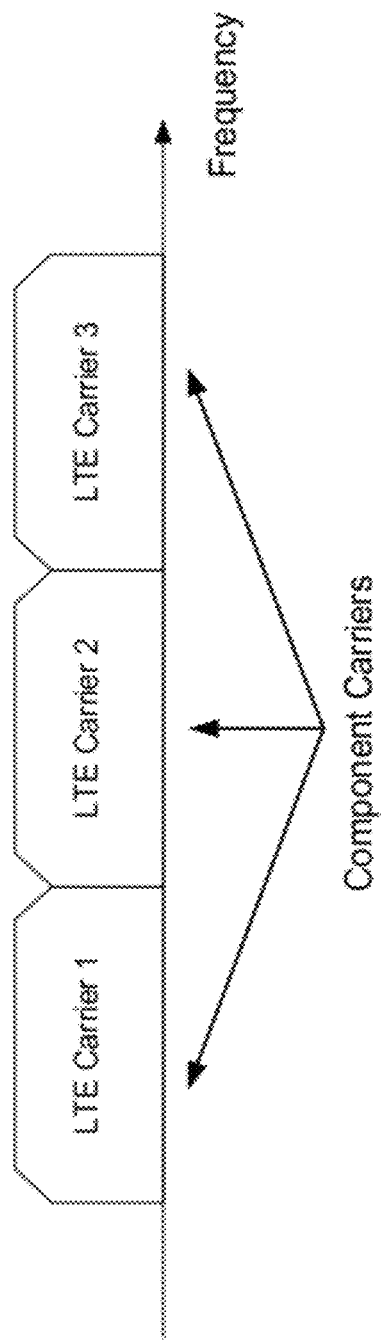
FIG. 5A discloses a continuous carrier aggregation type.
Figure 5B:
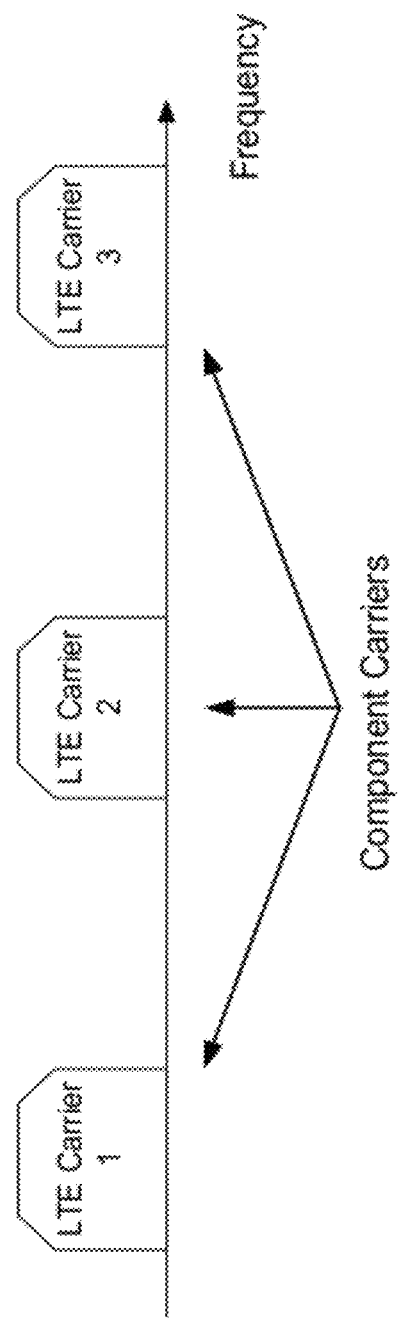
FIG. 5B discloses a non-continuous carrier aggregation type.

For the LTE-Advanced mobile systems, two types of carrier aggregation (CA) methods have been proposed, continuous CA and non-continuous CA. They are illustrated in FIGS. 5A and 5B. Non-continuous CA occurs when multiple available component carriers are separated along the frequency band (FIG. 5B). On the other hand, continuous CA occurs when multiple available component carriers are adjacent to each other (FIG. 5A). Both non-continuous and continuous CA aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNodeB) has fixed transmitting power on each component carrier, the effective coverage or supportable modulation and coding of each component carrier may be different.

Data Aggregation Schemes

Figure 6:
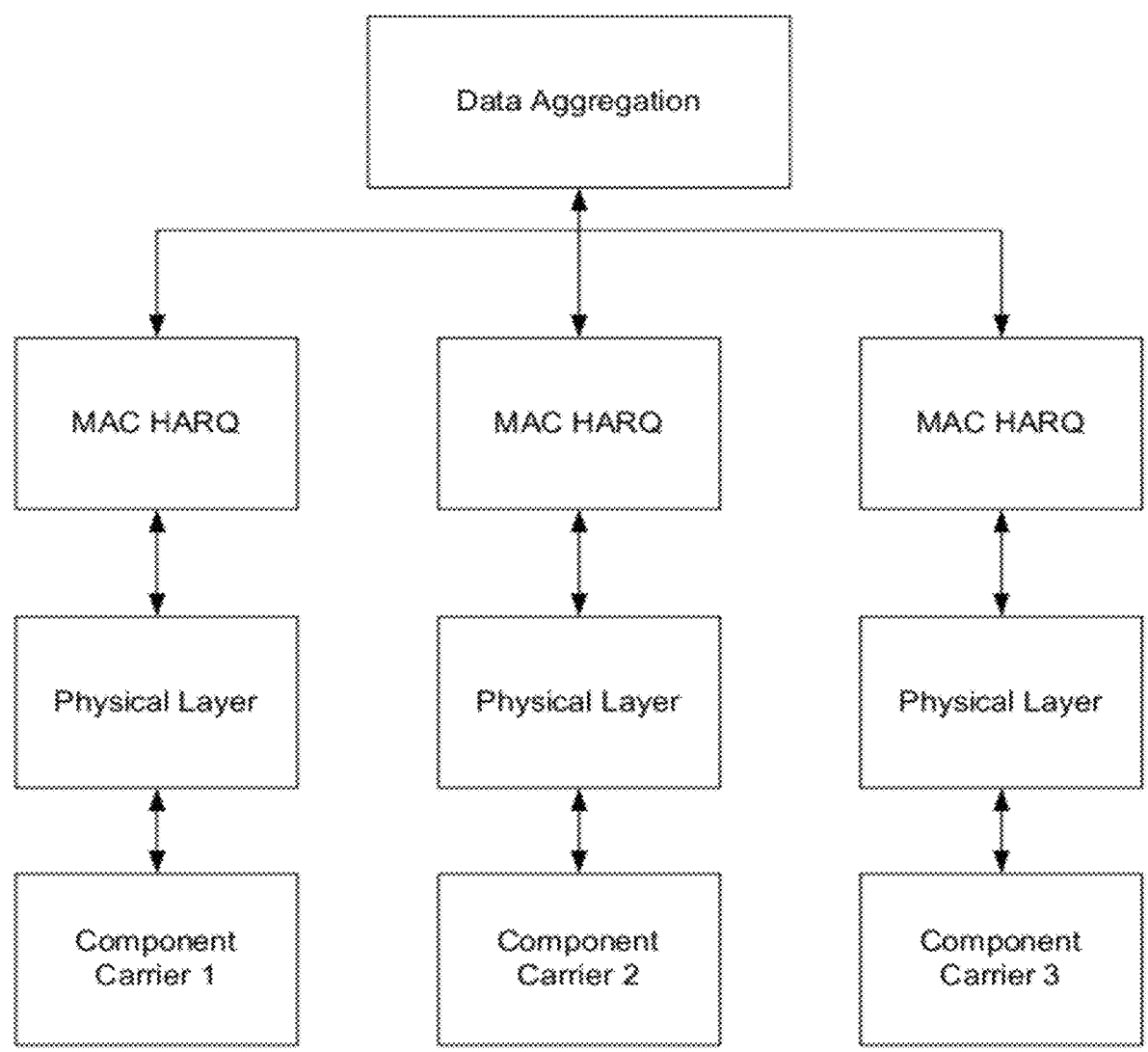
FIG. 6 discloses media access control (MAC) layer data aggregation.

FIG. 6 illustrates aggregating transmission blocks (TBs) from different component carriers at the medium access control (MAC) layer for an IMT-Advanced (International Mobile Telecommunications-Advanced) system. With MAC layer data aggregation, each component carrier has its own independent hybrid automatic repeat request (HARQ) entity in the MAC layer and its own transmission configuration parameters (e.g., transmitting power, modulation and coding schemes, and multiple antenna configuration) in the physical layer. Similarly, in the physical layer, one HARQ entity is provided for each component carrier.

Control Signaling

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. The control information for the multiple component carriers will be integrated as the signaling content in this dedicated control channel. As a result, backward compatibility with the control channel structure in LTE systems is maintained, while signaling overhead in the CA is reduced.

Multiple control channels for different component carriers are jointly coded and then transmitted over the entire frequency band formed by a third CA method. This approach offers low signaling overhead and high decoding performance in control channels, at the expense of high power consumption at the UE side. However, this method is not compatible with LTE systems.

Handover Control

It is preferable to support transmission continuity during the handover procedure across multiple cells when CA is used for IMT-Advanced UE. However, reserving sufficient system resources (i.e., component carriers with good transmission quality) for the incoming UE with specific CA configurations and quality of service (QoS) requirements may be challenging for the next eNodeB. The reason is that the channel conditions of two (or more) adjacent cells (eNodeBs) may be different for the specific UE. In one approach, the UE measures the performance of only one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

According to various examples, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH). Signaling and payload may be transmitted both on the downlink by the eNode B to the UE, and on the uplink by the UE to the eNodeB.

In some examples, there may be multiple primary carriers. In addition, secondary carriers may be added or removed without affecting the basic operation of the UE, including physical channel establishment and RLF procedures which are layer 2 and layer 3 procedures, such as in the 3GPP technical specification 36.331 for the LTE RRC protocol.

Those of skill in the art would understand that information and signals may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The functional blocks and modules described below may be processors, electronics devices, hardware devices, electronics components, logical circuits, memories, software codes, firmware codes, etc., or any combination thereof. The various blocks and modules may be configured to implement the embodiments discussed herein.

Improved Acknowledgement/Negative Acknowledgement Feedback for TDD

Acknowledgement (ACK) and/or negative acknowledgement (NAK) protocols are employed by wireless communication systems to determine whether transmissions between UEs and eNodeBs were properly received. Depending on the communication protocol, different numbers of bits may be allocated for ACK/NAK purposes. For FDD operation, up to 10 ACK/NAK bits are supported when the UE is configured with 5 component carriers, where 2 bits are assigned to each component carrier in carrier aggregation. For TDD operation, up to 20 ACK/NAK bits are supported when the UE is configured with 5 component carriers. For PUCCH schemes in 3GPP Release 10, UEs may support up to 4 ACK/NAK bits for Format 1$b$ channel selection and a full range of ACK/NAK bits for DFT-S-OFDM (Discrete Fourier Transform Spread Orthogonal Frequency Division Multiplexing).

When performing ACK/NAK decoding, an eNodeB may know whether a downlink component carrier (CC) is scheduled, and may perform ACK/NAK decoding accordingly. For CCs not scheduled, there is no need to perform ACK/NAK detection.

Figure 7:
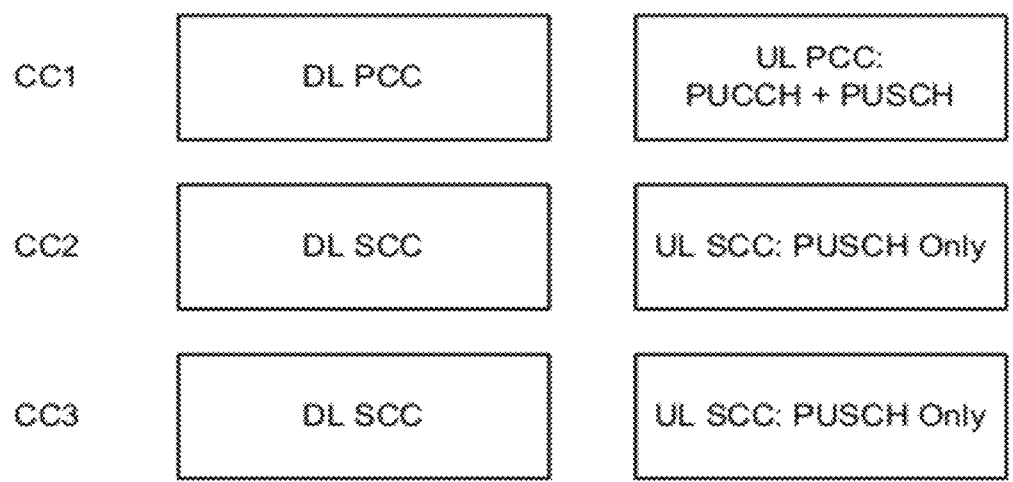
FIG. 7 illustrates one configuration of downlink to uplink common carrier mapping for acknowledgement/negative acknowledgement according to one aspect of the present disclosure.

In carrier aggregation one component carrier is designated as a primary component carrier (PCC) and others may be secondary component carriers (SCCs). A primary component carrier may be semi-statically configured by higher layers on a per UE basis. When signals such as ACK/NAK information, channel state information (CSI), and a scheduling request (SR) are transmitted on a PUCCH, they are transmitted on the primary component carrier. Secondary component carriers do not carry PUCCH for a given UE. For ACK/NAK purposes it is possible to configure up to 5:1 downlink to uplink component carrier mapping, meaning one uplink component carrier supports ACK/NAK transmission on a PUCCH for up to five downlink component carriers. FIG. 7 shows three downlink and three uplink component carriers (CC1, CC2, CC3). The uplink primary component carrier (UL PCC) supports PUCCH (control) transmission, in addition to PUSCH (data) transmission. The uplink secondary component carriers (SCCs) only support PUSCH transmission.

Different ACK/NAK codebook/mapping tables may be configured for different channel selection formats. For example, for format 3, codebook selection may be based on configured component carriers and configured transmission modes for each component carrier. Discontinuous transmission (DTX) operation may be coded the same state as NAK (e.g., =0). An eNodeB may know whether a downlink component carrier is scheduled and may thus perform ACK/NAK decoding accordingly. For example, for component carriers not scheduled, no ACK/NAK detection for these component carriers is performed. For format 1$b$ based channel selection the ACK/NAK mapping table may be dependent on the number of configured component carriers and transmission modes.

Figure 8:
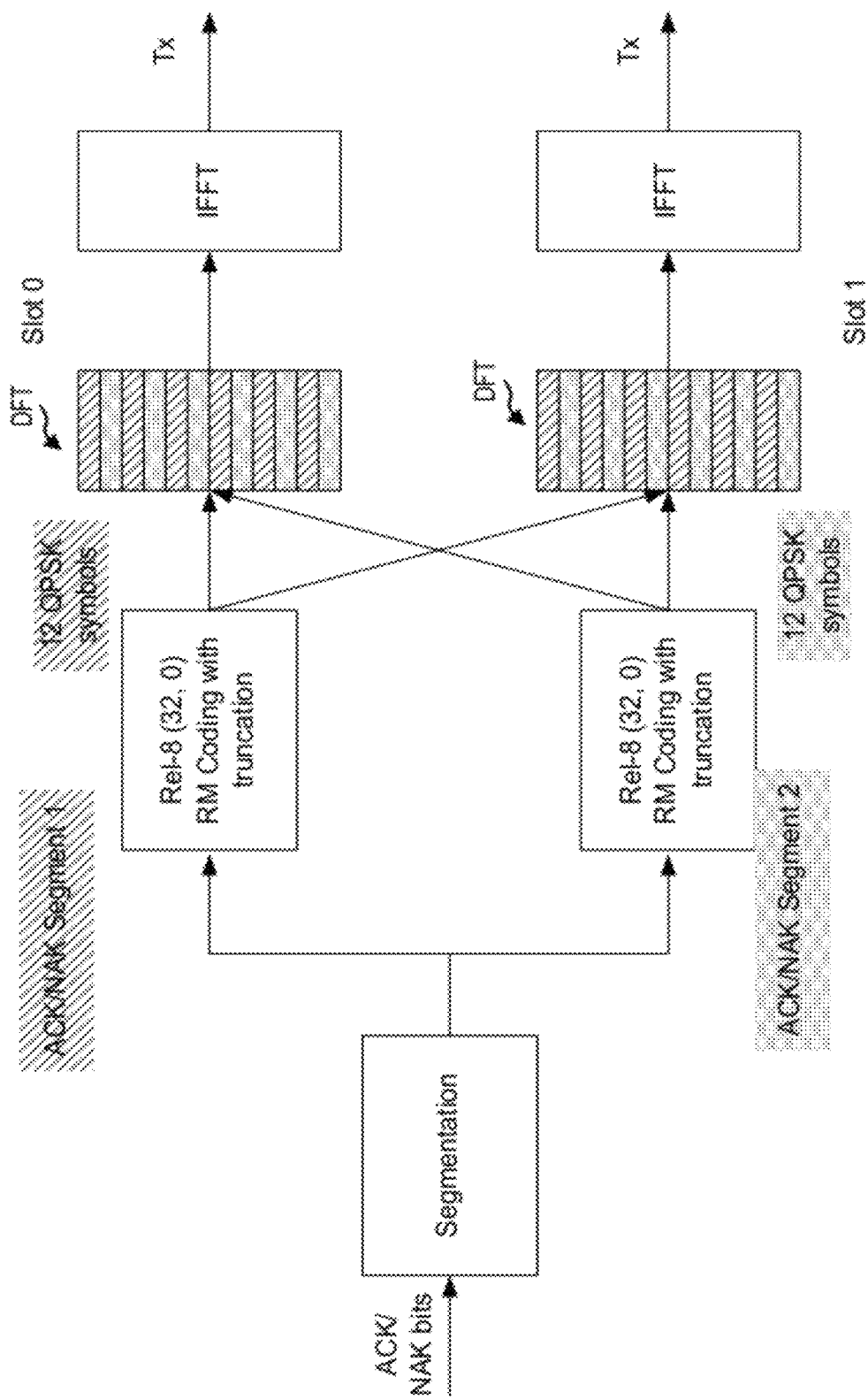
FIG. 8 illustrates split Reed-Muller coding processing for large acknowledgement/negative acknowledgement bit allocations.

The number of bits allocated to ACK/NAK may impact a variety of operations in wireless communication. For DFT-S-OFDM, the ACK/NAK payload size may impact how the Reed-Muller coding is performed. For example, if 11 or fewer bits (e.g., 10 bits ACK/NAK and joint coding with a 1-bit scheduling request, or 11 bits ACK/NAK without a 1-bit scheduling request) are allocated to ACK/NAK, (32, O) Reed-Muller (RM) code from Release-8 with circular buffer rate matching can be used, where O is the number of ACK/NAK bits and/or a 1-bit scheduling request. If there are more than 11 bits (ACK/NAK and/or scheduling request), the payload bits may be segmented into two blocks for operation as shown in FIG. 8. For ACK/NAK feedback payload size N, the ACK/NAK bits are roughly equally segmented into two ACK/NAK blocks of length ceiling (N/2) and N-ceiling (N/2). Each ACK/NAK block contains less than or equal to 11 bits, encoded with Release-8 RM (32, O) coding with the last 8 rows punctured and modulated into 12 Quadrature Phase Shift Keying (QPSK) symbols. The 24 QPSK symbols collected alternatively from the two ACK/NAK blocks (segment 1 and segment 2 in FIG. 8) are transmitted (Tx) on two slots (slot 0 and slot 1 in FIG. 8) after discrete Fourier transform (DFT) processing and inverse fast Fourier transform (IFFT) processing.

The number of ACK/NAK bits may impact PUCCH power control, as well as resource determination for uplink control information (UCI) when the UCI is piggybacked on PUSCH.

It is desirable to match the number of ACK/NAK bits as closely as possible to the communication subframes to avoid unnecessary allocation of ACK/NAK bits. This allocation may be difficult, however, in situations where it is unclear whether certain subframes may be used. For example, in Release-8, seven TDD configurations are supported, as shown in Table 1:

TABLE 1

| Uplink-downlink configuration | Downlink to Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The subframes are divided into downlink subframes (D), uplink subframes (U), and special subframes (S).

Figure 9:
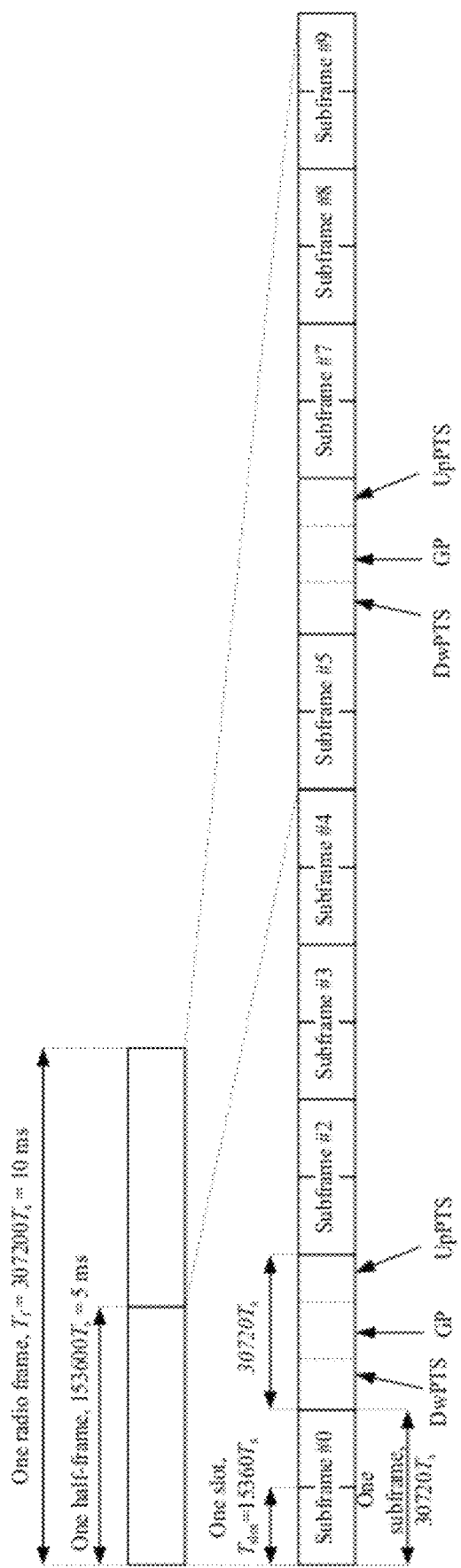
FIG. 9 is a diagram showing a sample configuration of a special subframe.

FIG. 9 shows a sample configuration including special subframes. There are eight possible configurations of special subframes, reflecting different combinations of DwPTS (Downlink Pilot Time Slot) symbols, GP (Guard Period) symbols, and UpPTS (Uplink Pilot Time Slot) symbols, where $T_f$ is a radio frame duration of 10 ms, $T_{slot}$ is a slot duration of 0.5 ms, and $T_s$ is a basic time unit of $1/(15000*2048)$ seconds.

Certain special subframe configurations may support downlink transmission and certain special subframe configurations may not. That is, in special subframes, the DwPTS may or may not be long enough to support downlink transmission. As an example, in the normal cyclic prefix case, for special subframe configurations where the DwPTS is 2-3 symbols long, no PDSCH may be transmitted in the special subframe, and the special subframe may not be configured for downlink transmission. If the DwPTS is 9-12 symbols long, then the DwPTS may support downlink transmission.

In certain carrier aggregation schemes, component carriers may have the same TDD uplink-downlink configuration. For example, in 3GPP Release 10, different CCs should have the same TDD uplink-downlink configuration (for example, the CCs will share the same one of configurations 0 through 6 shown in Table 1). Different CCs, however, may have different special subframe configurations. That is, while the CCs may each feature special subframes in the same subframe (for example, subframes 1 and 6 for TDD uplink-downlink configuration 0), the specific special subframes in different CCs may have different guard periods and different symbol allocations for their respective DwPTS.

ACK/NAK feedback may exclude certain CCs based on the special subframe configuration. The feedback arrangement will impact the total number of ACK/NAK bits, for example in PUCCH format 3 or PUCCH format 1b based channel selection. When the total number of ACK/NAK bits is less than or equal to 11, a single RM (32, 0) code may be sufficient. Otherwise, as explained above, dual RM coding may be employed. Similarly, PUCCH power control and resource determination for uplink control information (UCI) piggybacking on PUSCH may also be affected if the number of ACK/NAK bits varies.

Offered are solutions to efficiently allocate ACK/NAK bits by taking into account the DwPTS configurations across CCs when PUCCH format 3 or PUCCH format 1b based channel selection is configured to provide ACK/NAK feedback. The solutions are also applicable when PUCCH format 3 is configured for a single CC in TDD.

One aspect of the present disclosure involves allocating ACK/NAK bits based on the number of CCs, the DL transmission mode of each CC, and the number of subframes based on the HARQ relationship. The allocation is independent of the special subframe configuration. In other words, an ACK/NAK bit is allocated for each special subframe regardless of whether the special subframe supports downlink transmission. This solution may include allocating a single ACK/NAK bit (if the downlink transmission mode of the CC supports up to one transport block) or two ACK/NAK bits (if the downlink transmission mode of the CC supports up to two transport blocks) for special subframe(s) of each component carrier of a UE regardless of whether the special subframe(s) configuration of any component carrier of the UE supports downlink transmission. This solution is less complex, but may also allocate unnecessary ACK/NAK bits for subframes not being used for downlink transmission.

Another aspect of the present disclosure involves only allocating ACK/NAK bits to the special subframe if the special subframe is configured for downlink transmission. Further, ACK/NAK bits may be allocated for a particular component carrier of a UE when the special subframe configuration of the particular component carrier of the UE supports downlink transmission. CCs with DwPTS without any PDSCH transmission may be discounted and not allocated ACK/NAK bits. This solution more efficiently allocates ACK/NAK bits. Allocating ACK/NAK bits to special subframes based on whether the configuration is capable of downlink transmissions may also be employed in single carrier configurations.

Another aspect of the present disclosure involves allocating ACK/NAK bits to all special subframes for all CCs if just a single CC special subframe configuration carries PDSCH, i.e., is capable of downlink transmission. Alternatively, if no CC includes a special subframe configuration capable of downlink transmission, no ACK/NAK bits are allocated to special subframes for any CC. The above solution may also be used for configurations without carrier aggregation, i.e., a single carrier configuration.

In other aspects of the present disclosure, based on the special subframe configuration, ACK/NAK feedback may be provided for at least one downlink subframe associated with an uplink subframe in single carrier operation. In multi-carrier operation ACK/NAK feedback may be provided for at least one downlink subframe of a primary CC and at least one downlink subframe of a secondary CC. ACK/NAK feedback may be transmitted in an uplink control channel (e.g., PUCCH) on the primary CC. ACK/NAK feedback may be transmitted in an uplink data channel (e.g., PDSCH). When uplink control information is formatted as DFT-S-OFDM, encoding of the DFT-S-OFDM format may be based at least in part on a total number of ACK/NAK bits of all CCs for a UE. The DFT-S-OFDM encoding may depend on the number of downlink subframes associated with an uplink subframe transmitting the PUCCH. A transmission power of the PUCCH may be based at least in part on the allocated number of ACK/NAK bits.

Figure 10:
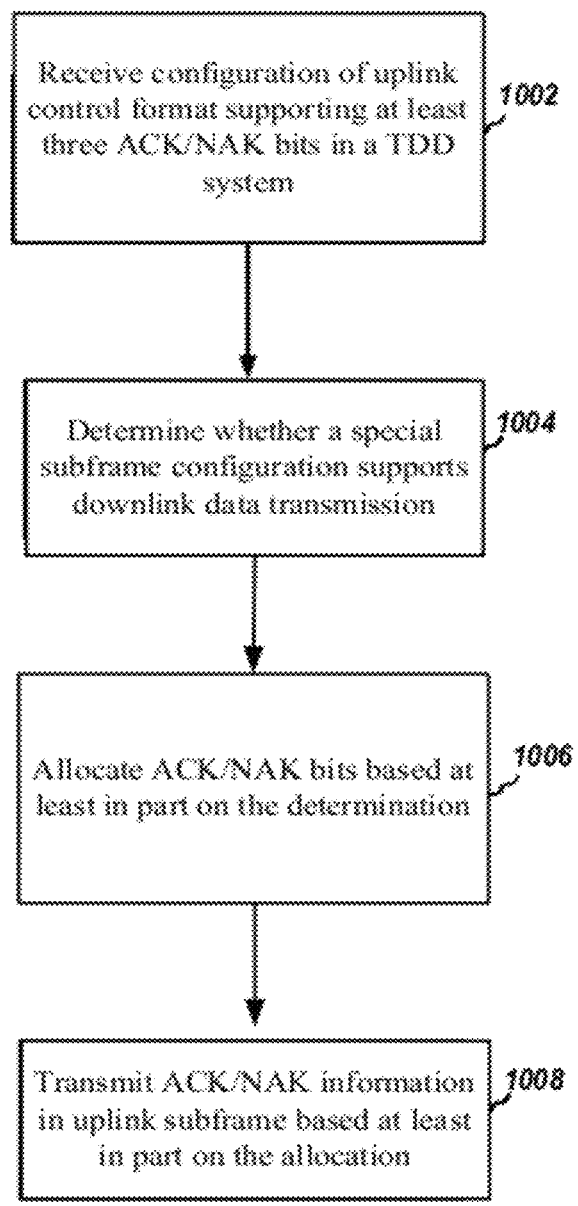
FIG. 10 is a flow chart illustrating a method of wireless communication according to an illustrative embodiment of the present disclosure.

FIG. 10 shows ACK/NAK bit allocation according to one aspect of the present disclosure. As shown in block 1002, a device such as a UE receives a configuration of an uplink control format supporting at least three acknowledgement/negative acknowledgement (ACK/NAK) bits in a time division duplex (TDD) system. As shown in block 1004, the device determines whether a special subframe configuration in a TDD configuration supports downlink data transmission. As shown in block 1006 the device allocates a number of ACK/NAK bits based at least in part on the determination. For example, bits could be allocated regardless of whether the special subframe configuration supports downlink transmission. In another example, the bits are only allocated when the special subframe configuration supports downlink transmission. This allocation could be for each CC and for each UE in a multicarrier environment. It could also be "one for all" where if any CC includes a configuration supporting downlink transmission, all CCs are allocated ACK/NAK bits for the special subframes. As shown in block 1008, the device transmits ACK/NAK information in an uplink subframe based at least in part on the allocation.

In one configuration, an apparatus, for example a device such as a UE 120, for wireless communication includes means for receiving a configuration of an uplink control format, means for determining whether a special subframe configuration supports downlink data transmission, means for allocating ACK/NAK bits, and means for transmitting ACK/NAK information in the allocated bits. In one aspect, the aforementioned means for a UE 120 may be the antennas 452, receive processor 458, controller/processor 480, memory 482, and/or transmit processor 464 configured to perform the functions recited by the aforementioned means. In another aspect, the aforementioned means may be a module or any apparatus configured to perform the functions recited by the aforementioned means.

Figure 11:
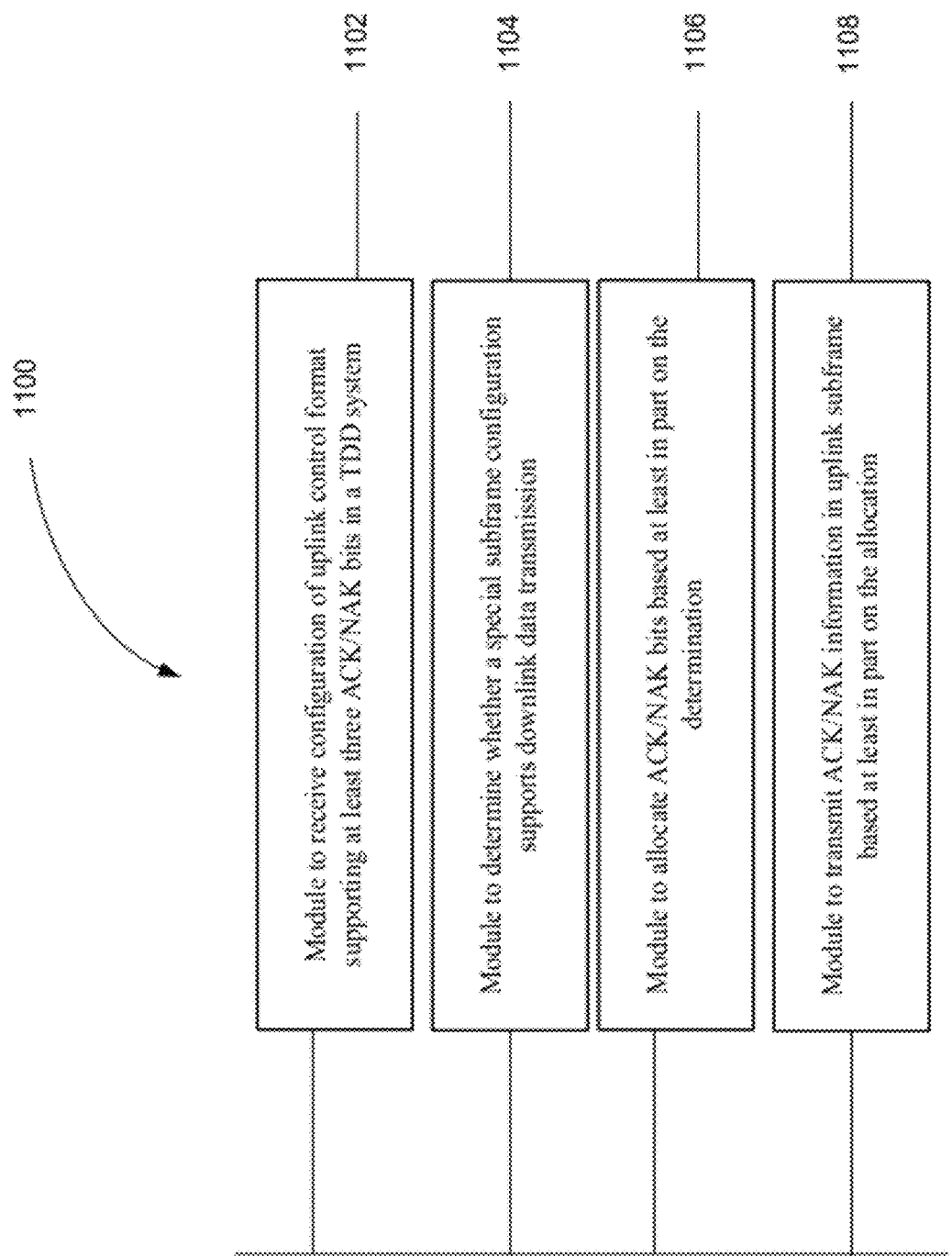
FIG. 11 is a block diagram illustrating components for wireless communication according to an illustrative embodiment of the present disclosure.

FIG. 11 shows a design of an apparatus 1100 for a UE, such as the UE 120 of FIG. 4. The apparatus 1100 includes a module 1102 to receive a configuration of an uplink control format supporting at least three ACK/NAK bits in a TDD system. The apparatus 1100 also includes a module 1104 to determine whether a special subframe configuration supports downlink data transmission. The apparatus 1100 also includes a module 1106 to allocate a number of ACK/NAK bits based at least in part on the determination. The apparatus also includes a module 1108 to transmit ACK/NAK information in an uplink subframe based at least in part on the allocation. The modules in FIG. 11 may be, e.g., processors, electronics devices/components, hardware devices, logical circuits, memories, software codes, firmware codes, etc., or any combination thereof.

Figure 12:
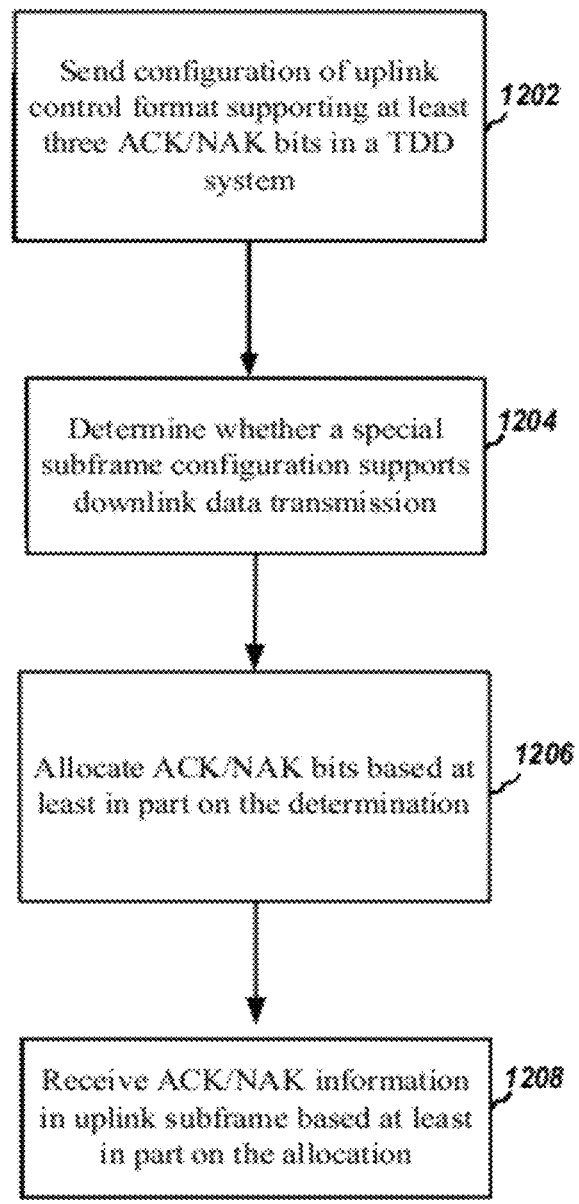
FIG. 12 is a flow chart illustrating a method of wireless communication according to an illustrative embodiment of the present disclosure.

FIG. 12 shows ACK/NAK bit allocation according to one aspect of the present disclosure. As shown in block 1202, a device such as an eNodeB sends a configuration of an uplink control format supporting at least three acknowledgement/negative acknowledgement (ACK/NAK) bits in a time division duplex (TDD) system. As shown in block 1204, the device determines whether a special subframe configuration supports downlink data transmission. As shown in block 1206 the device allocates a number of ACK/NAK bits based at least in part on the determination. For example, bits could be allocated regardless of whether the special subframe configuration supports downlink transmission. In another example, the bits are only allocated when the special subframe configuration supports downlink transmission. This allocation could be for each CC and for each UE in a multicarrier environment. It could also be "one for all" where if any CC includes a configuration supporting downlink transmission, all CCs are allocated ACK/NAK bits for the special subframes. As shown in block 1208, the device receives ACK/NAK information in an uplink subframe based at least in part on the allocation.

In one configuration, an apparatus, for example a device such as an eNodeB 110, for wireless communication includes means for sending a configuration of an uplink control format, means for determining whether a special subframe configuration supports downlink data transmission, means for allocating ACK/NAK bits, and means for receiving ACK/NAK information. In one aspect, the aforementioned means for an eNodeB 110 may be the antennas 434, receive processor 438, controller/processor 440, memory 442, transmit processor 420, and/or scheduler 444 configured to perform the functions recited by the aforementioned means. In another aspect, the aforementioned means may be a module or any apparatus configured to perform the functions recited by the aforementioned means.

Figure 13:
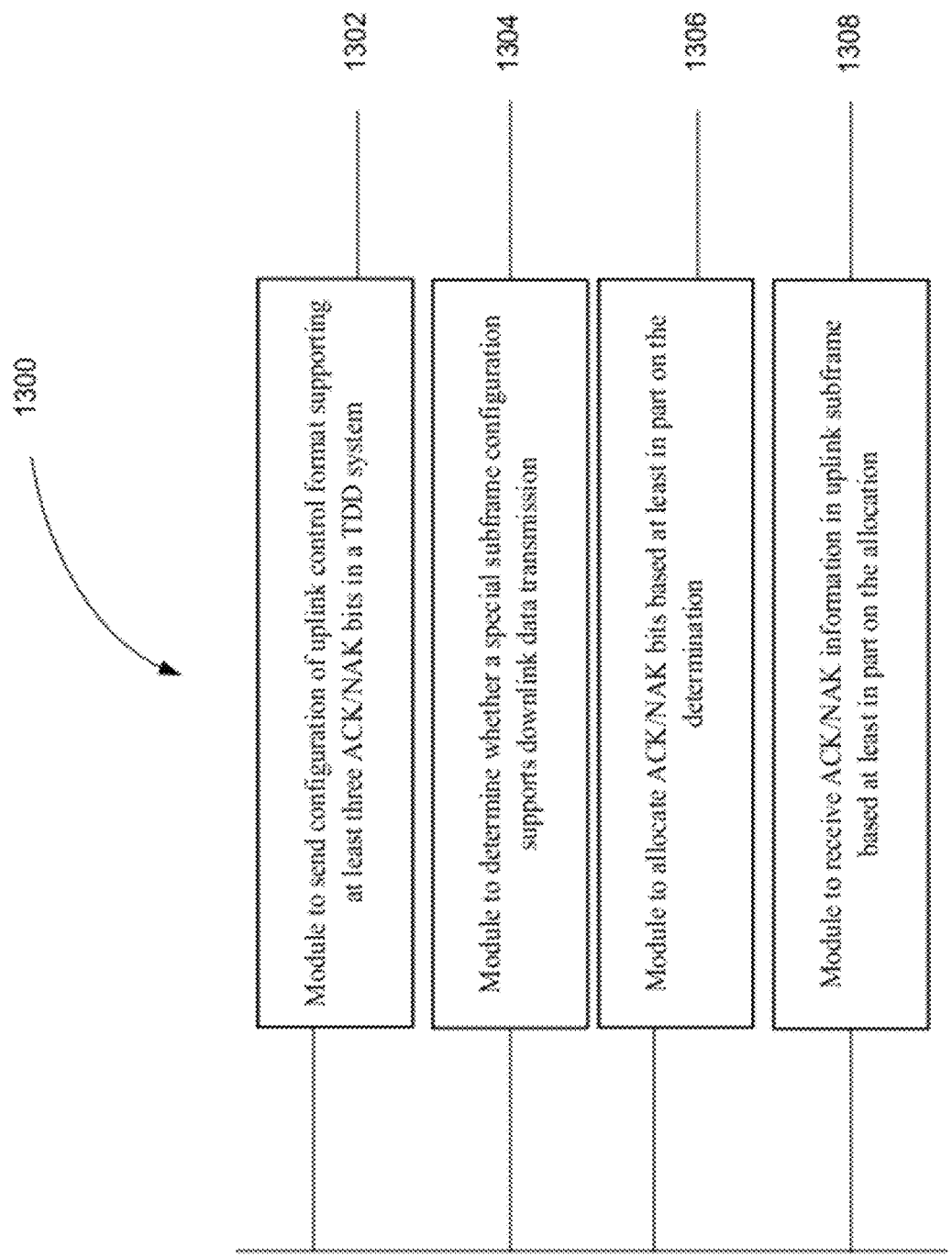
FIG. 13 is a block diagram illustrating components for wireless communication according to an illustrative embodiment of the present disclosure.

FIG. 13 shows a design of an apparatus 1300 for an eNodeB, such as the eNodeB 110 of FIG. 4. The apparatus 1300 includes a module 1302 to send a configuration of an uplink control format supporting at least three ACK/NAK bits in a TDD system. The apparatus 1300 also includes a module 1304 to determine whether a special subframe configuration supports downlink data transmission. The apparatus 1300 also includes a module 1306 to allocate a number of ACK/NAK bits based at least in part on the determination. The apparatus also includes a module 1308 to receive ACK/NAK information based at least in part on the allocation in an uplink subframe. The modules in FIG. 13 may be, e.g., processors, electronics devices/components, hardware devices, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied, e.g., directly in hardware, in a software module executed by a processor, or in a combination thereof. A software module, e.g., may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
receiving, at a user equipment (UE), a configuration of an uplink control format supporting at least three payload bits for an acknowledgement/negative acknowledgement (ACK/NAK) payload;
determining, at the UE, a special subframe configuration for a special subframe of each component carrier (CC) of a set of CCs scheduled for a downlink transmission;
determining, at the UE, whether the scheduled special subframe of each CC of the set of CCs supports a downlink data transmission based on a length of a downlink pilot time slot of the special subframe configuration;
determining, at the UE, a number of payload bits to allocate to the ACK/NAK payload based on a number of payload bits allocated for each CC of the set of CCs, a number of payload bits allocated for a given CC of the set of CCs is greater than zero when a scheduled special subframe for the given CC supports the downlink data transmission, and the number of payload bits allocated for the given CC is zero when the scheduled special subframe for the given CC does not support the downlink data transmission;
determining, at the UE, a size of the ACK/NAK payload based at least in part on the determined number of payload bits; and
transmitting, at the UE, ACK/NAK information for the set of CCs in an uplink subframe based on the determined size of the ACK/NAK payload.

2. The method of claim 1 in which the ACK/NAK information provides feedback for at least one downlink subframe associated with the uplink subframe, in a single carrier configuration.

3. The method of claim 1 in which the ACK/NAK information provides feedback for at least one downlink subframe of a primary component carrier and at least one downlink subframe of a secondary CC.

4. The method of claim 3 in which the ACK/NAK information comprises an uplink transmission in an uplink control channel on a primary carrier.

5. The method of claim 3 in which determining the size of the ACK/NAK payload and the number of payload bits to allocate are performed for each primary and secondary CC.

6. The method of claim 1 in which the ACK/NAK information comprises an uplink transmission in an uplink control channel.

7. The method of claim 1 in which the ACK/NAK information comprises an uplink transmission in an uplink data channel.

8. The method of claim 1, in which uplink control information comprises a DFT-S-OFDM (Discrete Fourier Transform Spread Orthogonal Frequency Division Multiplexing) format, and further comprising determining an encoding scheme for the DFT-S-OFDM format based at least in part on the size of the ACK/NAK payload.

9. The method of claim 8, in which the encoding is further dependent on a number of downlink subframes associated with an uplink subframe transmitting a PUCCH (Physical Uplink Control Channel).

10. The method of claim 8, further comprising determining a transmission power of a PUCCH (Physical Uplink Control Channel) at least in part based on the allocated payload bits.

11. An apparatus for wireless communication comprising:
means for receiving, at a user equipment (UE), a configuration of an uplink control format supporting at least three payload bits for an acknowledgement/negative acknowledgement (ACK/NAK) payload;
means for determining, at the UE, a special subframe of each component carrier (CC) of a set of CCs scheduled for a downlink transmission;
means for determining, at the UE, whether the scheduled special subframe of each CC of the set of CCs supports a downlink data transmission based on a length of a downlink pilot time slot of the special subframe configuration;

means for determining, at the UE, a number of payload bits to allocate to the ACK/NAK payload based on a number of payload bits allocated for each CC of the set of CCs, a number of payload bits allocated for a given CC of the set of CCs is greater than zero when a scheduled special subframe for the given CC supports the downlink data transmission, and the number of payload bits allocated for the given CC is zero when the scheduled special subframe for the given CC does not support the downlink data transmission;

means for determining, at the UE, a size of the ACK/NAK payload based at least in part on the determined number of payload bits; and means for transmitting, at the UE, ACK/NAK information for the set of CCs in an uplink subframe based on the determined size of the ACK/NAK payload.

12. A non-transitory computer-readable medium having non-transitory program code recorded thereon for wireless communication by a user equipment (UE), the non-transitory program code executable by at least one processor to:
receive, at a user equipment (UE), a configuration of an uplink control format supporting at least three payload bits for an acknowledgement/negative acknowledgement (ACK/NAK) payload;
determine, at the UE, a special subframe configuration for a special subframe of each component carrier (CC) of a set of CCs scheduled for a downlink transmission;
determine, at the UE, whether the scheduled special subframe supports a downlink data transmission based on a length of a downlink pilot time slot of the special subframe configuration;
determine, at the UE, a number of payload bits to allocate to the ACK/NAK payload based on a number of payload bits allocated for each CC of the set of CCs, a number of payload bits allocated for a given CC of the set of CCs is greater than zero when a scheduled special subframe for the given CC supports the downlink data transmission, and the number of payload bits allocated for the given CC is zero when the scheduled special subframe for the given CC does not support the downlink data transmission;
determine, at the UE, a size of the ACK/NAK payload based at least in part on the determined number of payload bits; and
transmit, at the UE, ACK/NAK information for the set of CCs in an uplink subframe based on the determined size of the ACK/NAK payload.

13. A user equipment (UE) for wireless communication, comprising:
a memory; and
at least one processor coupled to the memory, the memory comprising program code executable by the at least one processor to cause the UE to:
receive a configuration of an uplink control format supporting at least three payload bits for an acknowledgement/negative acknowledgement (ACK/NAK) payload;
determine a special subframe configuration for a special subframe of each component carrier (CC) of a set of CCs scheduled for a downlink transmission;
determine whether the scheduled special subframe of each CC of the set of CCs supports a downlink data transmission based on a length of a downlink pilot time slot of the special subframe configuration;
determine a number of payload bits to allocate to the ACK/NAK payload based on a number of payload bits allocated for each CC of the set of CCs, a number of payload bits allocated for a given CC of the set of CCs is greater than zero when a scheduled special subframe for the given CC supports the downlink data transmission, and the number of payload bits allocated for the given CC is zero when the scheduled special subframe for the given CC does not support the downlink data transmission;
determine a size of the ACK/NAK payload based at least in part on the determined number of payload bits; and
transmit ACK/NAK information for the set of CCs in an uplink subframe based on the determined size of the ACK/NAK payload.

14. The UE of claim 13 in which the ACK/NAK information provides feedback for at least one downlink subframe associated with the uplink subframe, in a single carrier configuration.

15. The UE of claim 13 in which the ACK/NAK information provides feedback for at least one downlink subframe of a primary component carrier and at least one downlink subframe of a secondary CC.

16. The UE of claim 15 in which the ACK/NAK information comprises an uplink transmission in an uplink control channel on a primary carrier.

17. The UE of claim 15 in which the program code is further executable by the at least one processor to cause the UE to determine the size of the ACK/NAK payload and the number of payload bits to allocate for each primary and secondary CC.

18. The UE of claim 13 in which the ACK/NAK information comprises an uplink transmission in an uplink control channel.

19. The UE of claim 13 in which the ACK/NAK information comprises an uplink transmission in an uplink data channel.

20. The UE of claim 13, in which:
uplink control information comprises a DFT-S-OFDM (Discrete Fourier Transform Spread Orthogonal Frequency Division Multiplexing) format, and
the program code is further executable by the at least one processor to cause the UE to determine an encoding scheme for the DFT-S-OFDM format based at least in part on the size of the ACK/NAK payload.

21. The UE of claim 20, in which the encoding is further dependent on a number of downlink subframes associated with an uplink subframe transmitting a PUCCH (Physical Uplink Control Channel).

22. The UE of claim 20, in which the program code is further executable by the at least one processor to cause the UE to determine a transmission power of a PUCCH (Physical Uplink Control Channel) at least in part based on the allocated payload bits.

23. A method of wireless communication comprising:
sending a configuration of an uplink control format supporting at least three payload bits for an acknowledgement/negative acknowledgement (ACK/NAK) payload;
determining a special subframe configuration for a special subframe of each component carrier (CC) of a set of CCs scheduled for a downlink transmission;
determining whether the scheduled special subframe of each CC of the set of CCs supports a downlink data transmission based on a length of a downlink pilot time slot of the special subframe configuration;
determining a number of payload bits to allocate to the ACK/NAK payload based on a number of payload bits allocated for each CC of the set of CCs, a number of payload bits allocated for a given CC of the set of CCs is greater than zero when a scheduled special subframe for the given CC supports the downlink data transmission, and the number of payload bits allocated for the given CC is zero when the scheduled special subframe for the given CC does not support the downlink data transmission;

determining a size of the ACK/NAK payload based at least in part on the determined number of payload bits; and receiving ACK/NAK information for the set of CCs in an uplink subframe based at least in part on the determined size of the ACK/NAK payload.

24. The method of claim 23 in which the ACK/NAK information provides feedback for at least one downlink subframe associated with the uplink subframe, in a single carrier configuration.

25. The method of claim 23 in which the ACK/NAK information provides feedback for at least one downlink subframe of a primary component carrier and at least one downlink subframe of a secondary CC.

26. The method of claim 25 in which the ACK/NAK information comprises an uplink transmission in an uplink control channel on a primary carrier.

27. The method of claim 25 in which determining the size of the ACK/NAK payload and the number of payload bits to allocate are performed for each primary and secondary CC.

28. The method of claim 23 in which the ACK/NAK information comprises an uplink transmission in an uplink control channel.

29. The method of claim 23 in which the ACK/NAK information comprises an uplink transmission in an uplink data channel.

30. The method of claim 23, in which uplink control information comprises a DFT-S-OFDM (Discrete Fourier Transform Spread Orthogonal Frequency Division Multiplexing) format, and further comprising determining an encoding scheme for the DFT-S-OFDM format based at least in part on the size of the ACK/NAK payload.

31. The method of claim 30, in which the encoding is further dependent on a number of downlink subframes associated with an uplink subframe transmitting a PUCCH (Physical Uplink Control Channel).

32. The method of claim 30, further comprising determining a transmission power of a PUCCH (Physical Uplink Control Channel) at least in part based on the allocated payload bits.

33. An apparatus for wireless communication comprising:
means for sending a configuration of an uplink control format supporting at least three payload bits for an acknowledgement/negative acknowledgment (ACK/NAK) payload;
means for determining a special subframe configuration for a special subframe of each component carrier (CC) of a set of CCs scheduled for a downlink transmission;
means for determining whether the scheduled special subframe of each CC of the set of CCs supports a downlink data transmission based on a length of a downlink pilot time slot of the special subframe configuration;
means for determining a number of payload bits to allocate to the ACK/NAK payload based on a number of payload bits allocated for each CC of the set of CCs, a number of payload bits allocated for a given CC of the set of CCs is greater than zero when a scheduled special subframe for the given CC supports the downlink data transmission, and the number of payload bits allocated for the given CC is zero when the scheduled special subframe for the given CC does not support the downlink data transmission;

means for determining a size of the ACK/NAK payload based at least in part on the determined number of payload bits; and means for receiving ACK/NAK information for the set of CCs in an uplink subframe based on the determined size of the ACK/NAK payload.

34. A non-transitory computer-readable medium having non-transitory program code recorded thereon for wireless communication by an apparatus, the non-transitory program code executable by at least one processor to cause the apparatus to:
send a configuration of an uplink control format supporting at least three payload bits for an acknowledgement/negative acknowledgement (ACK/NAK) payload;
determine a special subframe configuration for a special subframe of each component carrier (CC) of a set of CCs scheduled for a downlink transmission;
determine whether the scheduled special subframe of each CC of the set of CCs supports a downlink data transmission based on a length of a downlink pilot time slot of the special subframe configuration;
determine a number of payload bits to allocate to the ACK/NAK payload based on a number of payload bits allocated for each CC of the set of CCs, a number of payload bits allocated for a given CC of the set of CCs is greater than zero when a scheduled special subframe for the given CC supports the downlink data transmission, and the number of payload bits allocated for the given CC is zero when the scheduled special subframe for the given CC does not support the downlink data transmission;
determine a size of the ACK/NAK payload based at least in part on the determined number of payload bits; and
receive ACK/NAK information for the set of CCs in an uplink subframe based on the determined size of the ACK/NAK payload.

35. An apparatus for wireless communication, comprising:
a memory; and
at least one processor coupled to the memory, the memory comprising program code executable by the at least one processor to cause the apparatus to:
send a configuration of an uplink control format supporting at least three payload bits for an acknowledgement/negative acknowledgement (ACK/NAK) payload;
determine a special subframe configuration for a special subframe of each component carrier (CC) of a set of CCs scheduled for a downlink transmission;
determine whether the scheduled special subframe of each CC of the set of CCs supports a downlink data transmission based on a length of a downlink pilot time slot of the special subframe configuration;
determine a number of payload bits to allocate to the ACK/NAK payload based on a number of payload bits allocated for each CC of the set of CCs, a number of payload bits allocated for a given CC of the set of CCs is greater than zero when a scheduled special subframe for the given CC supports the downlink data transmission, and the number of payload bits allocated for the given CC is zero when the scheduled special subframe for the given CC does not support the downlink data transmission;

determine a size of the ACK/NAK payload based at least in part on the determined number of payload bits; and receive ACK/NAK information for the set of CCs in an uplink subframe based on the determined size of the ACK/NAK payload.

36. The apparatus of claim 35 in which the ACK/NAK information provides feedback for at least one downlink subframe associated with the uplink subframe, in a single carrier configuration.

37. The apparatus of claim 35 in which the ACK/NAK information provides feedback for at least one downlink subframe of a primary component carrier and at least one downlink subframe of a secondary CC.

38. The apparatus of claim 37 in which the ACK/NAK information comprises an uplink transmission in an uplink control channel on a primary carrier.

39. The apparatus of claim 37 in which the program code is further executable by the at least one processor to cause the apparatus to determine the size of the ACK/NAK payload and the number of payload bits to allocate for each primary and secondary CC.

40. The apparatus of claim 35 in which the ACK/NAK information comprises an uplink transmission in an uplink control channel.

41. The apparatus of claim 35 in which the ACK/NAK information comprises an uplink transmission in an uplink data channel.

42. The apparatus of claim 35, in which:
uplink control information comprises a DFT-S-OFDM (Discrete Fourier Transform Spread Orthogonal Frequency Division Multiplexing) format, and
the program code is further executable by the at least one processor to cause the apparatus to determine an encoding scheme for the DFT-S-OFDM format based at least in part on the size of the ACK/NAK payload.

43. The apparatus of claim 42, in which the encoding is further dependent on a number of downlink subframes associated with an uplink subframe transmitting a PUCCH (Physical Uplink Control Channel).

44. The apparatus of claim 42, in which the program code is further executable by the at least one processor to cause the apparatus to determine a transmission power of a PUCCH (Physical Uplink Control Channel) at least in part based on the allocated payload bits.

* * * * *